Aug. 29, 1967  H. R. DINKELACKER  3,338,035
PARALLEL PLATE DEFLECTION TYPE SEPARATOR
Filed March 11, 1965  2 Sheets-Sheet 1
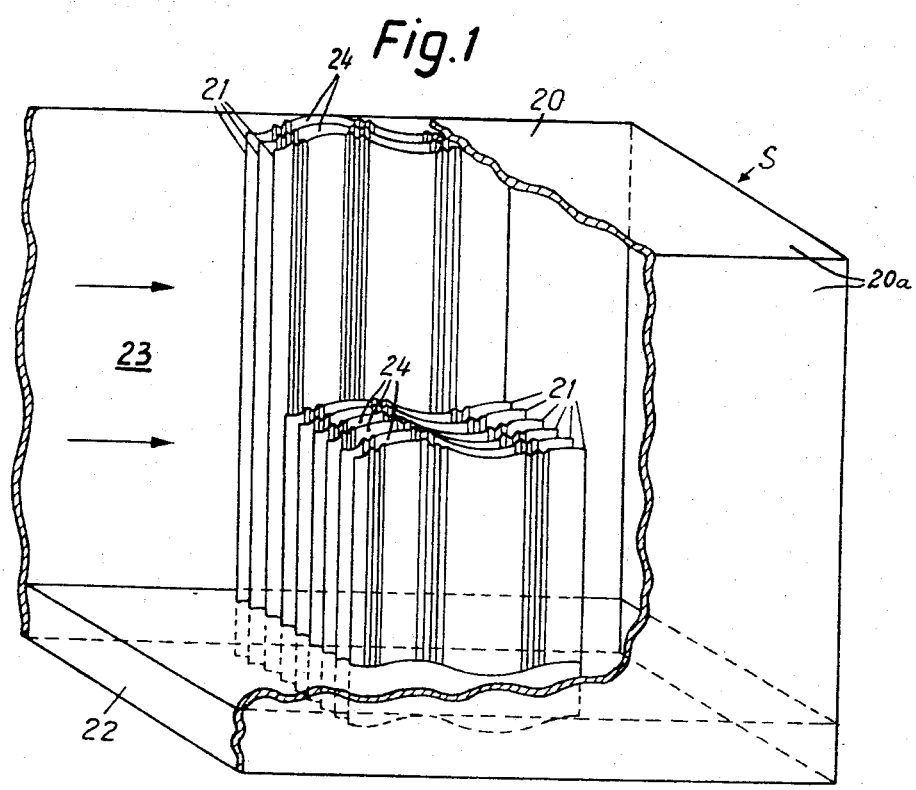
INVENTOR
Hans R. Dinkelacker
BY Werner W. Kleeman
His Attorney

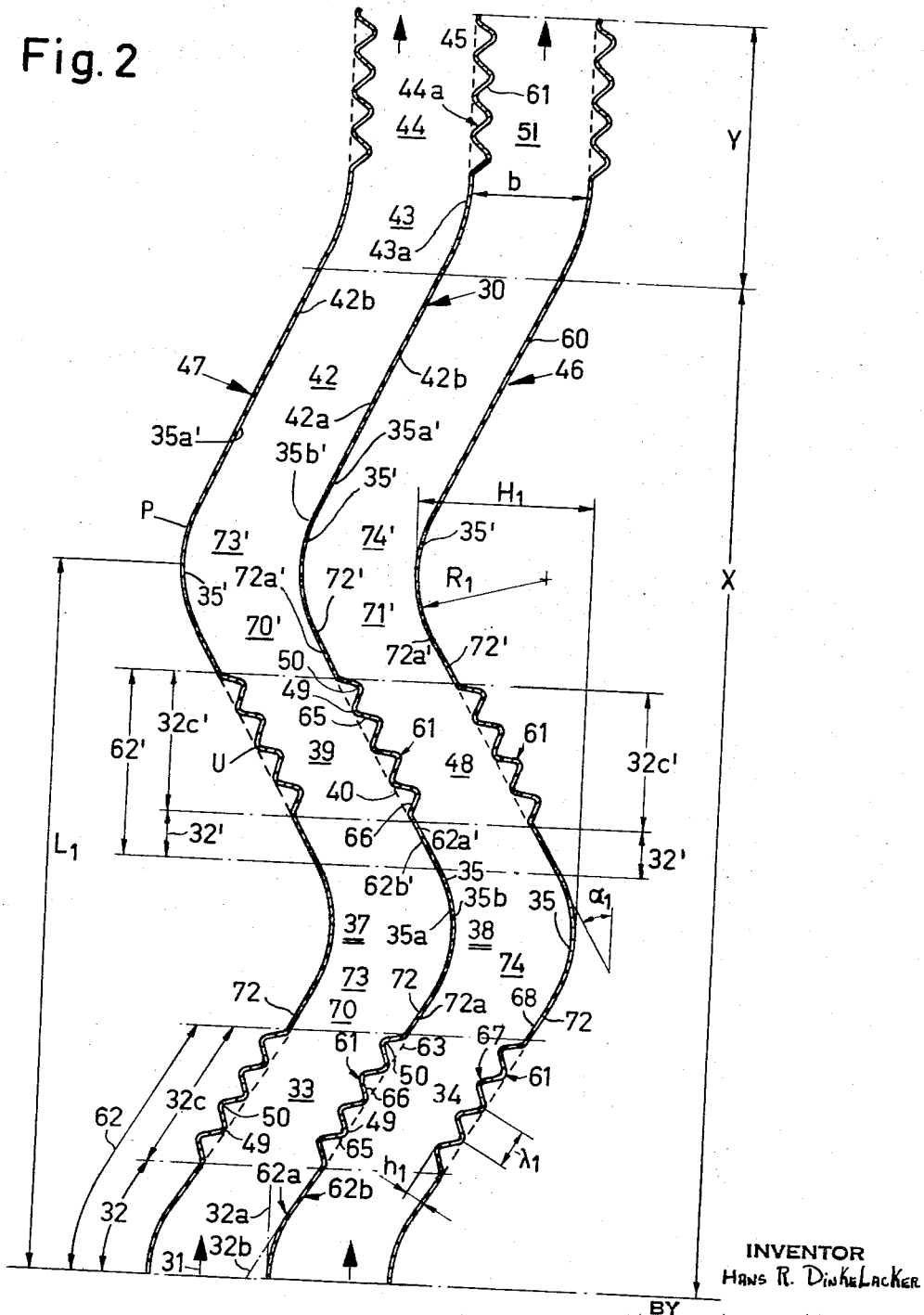

United States Patent Office

3,338,035
Patented Aug. 29, 1967

3,338,035
PARALLEL PLATE DEFLECTION TYPE SEPARATOR
Hans R. Dinkelacker, Buchenegg, Stallikon, Switzerland, assignor to Luwa A.G., Zurich, Switzerland, a corporation of Switzerland
Filed Mar. 11, 1965, Ser. No. 438,863
Claims priority, application Switzerland, May 30, 1962, 6,586/62
6 Claims. (Cl. 55—440)

This application is a continuation-in-part of my commonly assigned, co-pending United States application No. 282,730, filed May 23, 1963, now abandoned, and entitled "Separator."

The present invention relates to an improved separator for effectively separating suspended fluid particles from a gaseous stream and an improved partition wall construction for such separator.

Prior art apparatus are known which serve to separate suspended fluid particles, for example water droplets from a gas stream. During operation of such apparatus a gas stream is repeatedly deflected or turned so that the fluid particles entrained by the gas stream are separated from such gas stream due to their inertia. Separators of this type should be simple in construction, permit of an effective separation operation and, in so doing, provide a small resistance to flow.

The prior art separators incorporating partition walls shaped to effect a sharp turning of the gas stream as it moves from the inlet side to the outlet side of the separator create problems due to the sharp turning of the gas stream which produces pronounced pressure losses and reentrainment of the separated liquid. While separators of this type carry out the separation operation quite satisfactorily when the gas stream is moving at a velocity up to about 3 meters per second, at higher velocities the separator becomes quite inefficient.

It is with the above considerations in mind that the present improved separator has been evolved serving to permit separation of fluid particles from a gas stream with a minimal pressure drop in the gas stream and minimal reentrainment of the separated particles in the gas stream. The improved separator may be constructed to perform efficiently in a relatively small space and permits a significantly higher rate of gas flow than previously developed separators.

Accordingly, it is a primary object of the present invention to provide a separator for reliably and efficiently separating fluid particles from a gas current or stream with very low pressure losses even when working with high velocities of the gas current, that is, up to about 15 meters per second.

A further important object of the invention is the provision of an improved separator which is relatively simple in construction, easy to assemble, highly reliable in its operation as well as extremely economical to manufacture.

Yet a further important object of the present invention is to provide an improved separator capable of effectively separating fluid particles from a gas stream while providing little flow resistance for such gas stream.

Another object of the invention is to provide a separator which has relatively small space requirements, yet still provides a high separation efficiency and low pressure drop.

A further object of the invention is to provide a separator which can operate with high gas stream velocities up to about 15 meters per second, so that when the separator is used in an air conditioning plant it is possible to employ air handling ducts of relatively small diameters and if the inventive separator is installed in an existing air conditioning plant the flow velocity of the gas current moving through the flow channels of such plant can be correspondingly increased.

According to the invention, these and other objects which will become hereafter apparent are attained by forming the separator with spaced partition wall members, a pair of which define a flow path therebetween for the gas stream from which fluid particles are to be separated. A smooth curved arcuate portion is formed in each wall member defining a turning zone for the gas stream. Planar portions are formed in the wall members immediately downwstream of said arcuate portions defining a linear gas flow zone. A baffle surface is formed on the planar surface of the wall extending from the concave surface defining the turning zone so that the fluid particles which are heavier than the gas are turned less and impinge on said baffle surface. A plurality of ripples in said partition wall immediately following the baffle surface provide drainage channels for the liquid particles entrained on the baffle surface.

The specific details of a preferred embodiment of the invention and their mode of functioning will be particularly pointed out in clear, concise and exact terms in conjunction with the accompanying drawings wherein:

FIGURE 1 is a perspective view of a substantially complete separator designed according to the teachings of the present invention provided with partition walls of the type substantially illustrated in FIGURE 2, with a portion of the separator housing removed in order to expose internal physical structure; and FIGURE 2 schematically illustrates in horizontal sectional view details of three inventive partition walls forming two flow channels for the separator depicted in FIGURE 1.

Referring to the drawing, in FIGURE 1 there is depicted in perspective view an embodiment of inventive separator unit S designed according to the teachings of the present invention. For clarity a portion of the boundary walls 20a of the separator housing 20 have been removed in order to expose internal structure. Additionally the front partition walls have been shown as broken away. It will be seen that the separator S incorporates the separator housing 20 forming a main flow channel or chamber 23 for the main gas stream. In housing 20 a plurality of partition walls 21 are arranged in substantially upright manner and equally spaced from one another. Between any two neighboring partition walls 21 there is always formed a flow channel 24 provided for dividing a gas stream, such as air, conducting fluid particles, such as water, and flowing in the direction of the indicated arrows, into separate component or branch streams and for multiple turning or deflecting (here illustrated as a fourfold turning) of such branch streams. The flow channels 24 are generally always closed at their top and bottom ends by a corresponding wall of the separator housing 20. The lowermost portion or region 22 of the housing 20 serves as a collecting vessel for the fluid deposited at the partition walls 21 and is appropriately connected with a suitable outlet conduit or tap, not shown in the drawing.

Additionally, if the situation requires there can be provided a perforated intermediate floor or base, a so-called false bottom within the separator S, upon which the partition walls 21 are erected so that the compartment formed beneath such intermediate floor or false bottom is capable of serving as a collecting vessel or basin for the separated fluid. Advantageously, a collecting vessel of this type is screened-off or shielded from the gas stream. It is, however, an advantage of the inventive separator that such an intermediate floor or false bottom is not absolutely necessary, and that the partition walls can be immersed in the lower portion or erected at the bottom of the housing of the separator serving as a collecting vessel or basin 22 for the separated fluid, without the danger of a whirling-up of the separated fluid. Due to the path of flow of the gas current or stream achieved with the inventive separator, it is not necessary to provide a specific shielding of the collecting vessel from such gas current.

FIGURE 2 shows in schematic cross-section three partition walls 30, 46 and 47. It will be understood, however, that the number of partition walls, each of which are advantageously of similar construction so that the separator S can be assembled from a plurality of them, is dependent upon the width of the air or gas flow channel 23 in which such partition walls are arranged. Since these partition walls 30, 46 and 47 are each of the same construction, the description to follow will primarily concern itself with details of the physical structure of a single one of such partition walls, such as partition wall member 30.

More precisely, the partition walls 30, 46 and 47 depicted in FIGURE 2, by way of example, each embody a substantially sheet-like body member 60 formed of galvanized sheet iron for instance, which after fabrication is processed so as to remove any oily substances, such as grease or fat therefrom. Each of these partition walls exhibits primary undulations or corrugations, generally designated by reference character P. The wave length of the primary undulations is represented by reference character $L_1$, the undulation or wave height or depth by reference character $H_1$ and the radius of curvature by reference character $R_1$. It will further be observed that at the regions 33, 39, 44, and 34, 48, 51 of the flow channels 37 and 38 respectively, formed by the partition walls 30, 46 and 47, the latter additionally possess secondary undulations U in the form of wave-like furrows, rills, grooves, ripplings or the like, hereinafter conveniently referred to simply as ripples 61. The wave length or spacing between the crest or top of two neighboring secondary waves or ripples 61 is designated by reference character $\lambda_1$, and the undulation or wave height of depth by reference character $h_1$. Moreover, the number of secondary waves or ripples 61 is dependent upon the quantity of liquid e.g. water which is to be removed which, in turn, is dependent upon the height of the separator. The spacing or distance of the partition walls 30, 46 and 47 etc. from one another, measured at right angles to the arrow 31 schematically representing the inflow of the gas stream, is represented by reference character $b$. It can also be seen that with respect to the inflow direction of the air flowing through the separator the portions of the partition walls defining the flow channel regions 33 and 39 for instance are differently directed or inclined, wherein the angle of inclination of such wall portions in each direction is designated by reference character $\alpha_1$.

Partition walls designed according to the present invention wherein the above designated values which determine the shape of the primary and secondary undulations lie between the following boundary values, for illustrative values of $b$ between 10 millimeters and 50 millimeters, have proven themselves in practice to be particularly favorable:

$$0.04b < \lambda_1 < 0.8b$$
$$0.04b < h_1 < 0.4b$$
$$0.5b < R_1$$
$$0.8b < H_1 < 2.0b$$
$$15° < \alpha_1 < 45°$$

At this point it is briefly mentioned that the parameters of $R_1$ and $\alpha_1$ are decisive for obtaining the desired gradual turning of the gas stream moving through the flow channels.

Turning attention once again to specific details of a preferred embodiment of partition walls depicted in FIGURE 2, it will be appreciated that the gas current e.g. air flows in the direction of the arrow 31 and is subdivided into component or branch streams in the individual flow channels 37 and 38. As already stated, the partition walls 30, 46 and 47 are spaced from one another a distance $b$, assumed to be 25 millimeters in this instance, and these partition walls are all of the same construction.

Considering now details of the physical structure of a given partition wall, such as partition wall 30, it will be recognized that the first wall portion or section 32 at both of its faces or sides is smooth. This smooth wall portion 32 possesses a curvature which reduces with its length and has a starting or initial tangent portion 32a disposed substantially parallel to the arrow 31. Such initial tangent portion defines the inlet end of the relevant partition wall 30. From the inlet end the wall forms a smooth curved arcuate portion leading to a smooth planar portion 32b of this smooth wall portion 32 having an angle of inclination $\alpha_1$ with respect to the direction of the arrow 31 which in the illustrated embodiment is 34°. Thus the smooth curved arcuate portions of portions 32 define a turning zone for the air stream flowing therebetween, while the planar portions at the end of portion 32 define a linear flow zone. At face 62b lying on the planar surface of the planar portion of wall portion 32 a baffle wall section for the flow channel 38 is provided, while the opposite face or side 62a of wall portion 62 provides for the flow channel 37 a guide wall section in the linear flow zone defined by the planar surfaces 62a and 62b. The linear flow zone is continued through regions 33 and 34 on opposed sides of partition wall 30. Rippled portions 32c are formed in the partition walls with secondary undulations U in the form of ripples 61 which are essentially of sinusoidal-shape and include wave peaks 49 closer to the wall face 62b defining the baffle wall section and wave valleys 50 directed away from such face 62b of said baffle wall section. It will further be seen that the secondary undulations U are displaced out of the center of the partition wall 30 such that its wave peaks or tops 49 do not extend from an ideal boundary or tangent line 63 taken through these peaks 49, such line 63 being shown dotted in the drawing of FIGURE 2, into the flow channel 38 bounded by the relevant baffle wall section. In other words, the individual ripples 61 of the secondary undulations U at the face 62b of the partition wall defining a baffle wall section do not extend into the flow channel 38 bounded by such baffle wall section, and the peak portions 49 at the considered baffle wall section lie to one side of the tangent line 63 which is outside of the flow channel 38 and facing away from said baffle wall section. Such arrangement of the secondary undulations U has surprisingly proven itself to be particularly effective for reducing the pressure drop or losses.

It will further be observed that following each rippled portion 32c of the partition walls 30, 46 and 47 defining the flow channels 37 and 38 there appears a respective flow channel region 70 and 71 which provides a so-called expansion zone. This is so since it will be recognized that the wall portion 72 of each aforesaid partition wall and bounding the corresponding expansion zone of the flow channel is smooth, that is devoid of ripples, so that each branch of the gas stream can move into its associated flow channel region 70 and 71 which is larger in cross-sectional area than the preceding flow channel regions 33 and 34 faced by the rippled portions 32c. Thus, the gas stream can again expand in these aforesaid expansion zones. Although in reality the face 72a of the wall portion 72 still provides a certain baffling action upon the gas stream moving through flow channel region 34 for instance, the actual baffle wall section of partition wall 30 is still considered to be comprised of the smooth wall portion 32 and the subsequent rippled wall portion 32c. Following the just-considered expansion zones 70 and 71 of the flow channels 37 and 38 respectively, are the so-called turning or deflecting zones 73 and 74 respectively. Each such deflecting zone is bounded by a curved wall portion 35 possessing a radius of curvature $R_1$ the magnitude of which together with the value of $\alpha_1$, is chosen such as to gradually turn or deflect the gas-stream branch flowing through the relevant flow channel. Once again, it is pointed out that while the face 35a of the curved deflecting or turning wall portion 35 provides a certain baffle action for the next successive baffle wall section of partition wall 30—for such next successive baffle wall section the same reference numerals are again employed for corresponding wall portions, yet with the addition of a prime marking—nonetheless the actual baffle wall section is again considered to comprise the wall portion 62' incorporating the smooth wall portion 32' followed by the rippled wall portion 32c'.

The secondary undulations U of the wall portions 62 and 62' advantageously begin at that location where there is terminated the turning or deflecting of the inflowing air, in other words are disposed at the end region of the corresponding baffle wall section in the direction of gas flow and begin directly subsequent to the smooth wall portion 32 or 32'. Additionally, such secondary undulations of the wall portion 62 end before the curvature of the second point of turning, that is where the wall portion 35 begins, and prior to the expansion wall 72. In the illustrated embodiment the secondary undulations U exhibit, by way of illustration, a height or depth $h_1$ of 4.5 millimeters and a wave length $\lambda_1$ of 9 millimeters. The smooth curved deflecting wall section 35, the curvature of which first continually increases with the length, then again drops-off, as already indicated can provide at one face 35a a portion of the baffle wall section for the flow channel 37 and at the opposite face 35b a portion of the guide wall section for the flow channel 38. As previously explained, the following flow channel region 39 is faced by a wall portion 32c' which exhibits secondary undulations U incorporating ripples 61 of the same shape as the wall portion 32c of the flow channel region 33. Here again, such secondary undulations are formed such that the wave peaks or tops 49 do not extend out of the theoretical wall or tangent line 40 into the flow channel 37, in other words, the arrangement is exactly as previously described. The theoretical boundary or tangent line 40 is inclined through the angle $2\alpha_1=68°$ with respect to the theoretical boundary or tangent line 63.

Once again, an expansion zone or flow channel region 70' and 71' follows the flow channel regions 39 and 48 respectively. A smooth wall portion 72' of each partition wall and bounding the corresponding expansion zone has one face 72a' thereof providing a certain baffling action for the preceding baffle wall section defined by the face 62b' of the wall portion 62'. Here again, the expansion zones 70' and 71' are followed by turning or deflecting zones 73' and 74' respectively, bounded by the respective curved turning wall portion 35', designed and functioning in the same manner as previously considered with regard to turning zones 73 and 74.

It will be recognized that the smooth turning wall portion 35' follows the wall portion 72'. The curvature of this turning wall portion 35' initially increases with its length, then again drops-off, again forming at face 35a' to a certain extent a baffle wall section for the flow channel 38 and at the opposite face a guide wall section for the flow channel 37. The following flow channel region 42 incorporating wall portion 42a merges with the preceding turning wall portion 35'. This wall portion 42a is smooth and is inclined through the angle $2\alpha_1=68°$ with respect to the theoretical boundary or tangent line 40 and lies substantially parallel to the theoretical boundary or tangent line 63. One face 42b of such wall portion 42a provides a baffle wall section for the flow channel bounded by such face 42b. However, since at this location most of the water has already been separated by the upstream located baffle wall sections previously considered, it is not absolutely necessary to provide a rippled zone at this baffle wall section. The advantage of having such baffle wall section devoid of a rippled zone is that pressure losses are reduced. The smooth wall portion 42a of this flow channel region 42 subsequently transforms into the curved wall portion 43a of the curved deflecting region 43, the curvature of which increases with the length. This curved wall portion 43a transforms into a wall portion 44a of the flow channel region 44 which is inclined through the angle $\alpha_1=34°$ with respect to the wall portion 42a of channel region 42 and is again disposed substantially parallel to the gas inflow direction arrow 31. The wall portion 44a of section 44 also exhibits secondary undulations U which contact the theoretical boundary or tangent line 45 as previously explained, so that the ripples 61 thereof do not physically enter into the flow channel 37. The ripples 61 of wall portion 44a serve to collect any water separated at the face 42b of the preceding baffle wall section, to thereby prevent such water from being carried away by the outflowing air current.

Consistent with the foregoing explanation, it will be appreciated that whenever one face of a distinct wall portion or section of a partition wall functions as a baffle wall section for the defined flow channel bounded thereby, then the opposite face of this wall section functions as a guide wall section for the neighboring flow channel. This sequence of baffle wall sections and guide wall sections with intermediate disposed deflecting or turning locations is the same for all of the partition walls of a separator which extend parallel to one another. Moreover, it will be appreciated that at least some of the baffle wall sections incorporate a rippled zone at the end region thereof.

In the considered embodiment of partition wall member 30 it may be conveniently assumed that the portion of such partition wall lying between the region designated by reference character X provides the actual separating zone, which is then followed by the portion of the partition wall 30 extending between reference character Y providing a so-called straightening or rectifying zone. This straightening or rectifying zone, in the first instance, serves to impart the proper direction of flow to the component or branch stream and in that direction which such branch stream is to flow further. Since secondary undulations in the form of ripples 61 are also provided at the end portion or wall portion 44a there again also appears a baffle wall section and at the opposite face a guide wall section.

It will also be understood that each of the ripples 61 of any of the secondary undulations U each include a first wall surface 65 which is advantageously inclined at an angle which is greater than the inclination of the associated baffle wall section to thereby define an impact surface for the fluid particles entrained by the gas stream, and a second wall surface 66 advantageously inclined at an angle smaller than the inclination of the relevant baffle wall section to provide means for withdrawing fluid particles impinging against the aforesaid impact surface of the associated ripple.

Furthermore, it is here mentioned that the parameters determining the shape of the undulations P, U, in the described preferred embodiment, by way of illustration and not limitation, possess the following values:

$b=25$ millimeters
$\lambda_1=0.36b$
$h_1=0.18b$
$R_1=1.2b$
$H_1=1.2b$
$\alpha_1=34°$ Considering now the operation of the inventive separator S, it should be understood that the air flows in the direction of the arrow 31 into the neighboring flow channel 37 and 38. Due to the curved wall portion 32 of the partition wall 30 the air current is correspondingly deflected or turned in these flow channels. Specifically considering the flow in channel 38 it will be understood that the mass of air and the therein contained water droplets have the tendency to flow further in their original direction and, therefore, consolidate or concentrate at the partition wall 30, whereas on the other hand, a smaller concentration of air collects at the partition wall 46. The water droplets contained in the air current impinge against the curved wall portion 32 of the partition wall 30. Since the partition walls after fabrication have fat or grease removed therefrom, a coherent and continuous film forms at face 62b from the separated water droplets. The formation of this film is of decisive importance. The smooth construction of the wall portion 32 of the partition wall 30 turning the air current, considerably reduces the pressure losses in the separator. The air current displaces the water film formed by the separated water droplets into the zone of the flow channel region 34 having the wall portion 32c provided with secondary undulations U in the form of ripples 61. Since the secondary undulations U in this region 34, as previously explained, do not extend into the flow channel 38 the air current glides practically without being affected by these secondary undulations along the face 62b past the wall portion 32c of this region 34 and behaves as if the theoretical or ideal line 63 builds the wall. Consequently, hardly any turbulence or whirling is formed in the valleys 50 of the secondary undulations U which could again whirl-up droplets out of the water film.

It is important that the tops or peaks of the ripples 61 of the secondary undulations U are well rounded and do not exhibit any edges. As a result, there is achieved the favorable effect that no water droplets can be entrained from the film by the air current flowing by, which would otherwise be the case if there appeared edges. The valleys 50 of the ripples 61 of the secondary undulations U can exhibit very pronounced radii of curvature. However, according to a preferred embodiment the wave peaks 49 and valleys 50 exhibit the same radius of curvature. Due to the opposite curvature of these wave peaks and valleys the fluid film is subjected to oppositely directed surface tension vectors which bring about a difference in pressure in the water film between the wave peaks and the wave valleys. This pressure difference is directed such that the water film is sucked into the wave valleys 50. The water can then flow downwardly under the effect of gravity in the vertical ripples 61 which act as drainage channels. If the first ripple is filled with water then it overflows in the direction of flow of the air and the water film is then drawn into the next ripple. Depending upon the quantity of separated water and the height of the separator only one, two or all four of the ripples 61 are employed for conducting away the water.

Since the ripples 61 of the secondary undulations U of the partition wall 46 at the guide wall section 67 thereof project out of the plane of this partition wall 46 the cross-section of the flow channel 38 reduces by about 20%, whereby the velocity of the air in this section increases by about the same amount. Since the secondary undulations U already end before the beginning of the turning location 68 i.e. at the expansion zone 71, and the flow channel, therefore, again assumes its original cross-section, the velocity of the air again drops before the turning location 74. Consequently, the pressure losses are once again considerably reduced. In addition to this, the gradual turning of the air current by the primary undulations P which are gradually curved, that is, there are no sharp turning locations, provide for an increased separation effect and much lower pressure drop. All of these measures are of particular importance since the inventive separator can also work with high speed cleaners operating with air velocities up to about 15 meters per second.

At the wall portion 35 of the partition wall 46 the air current is deflected through the angle $2\alpha_1 = 68°$ and smaller water droplets, not removed from the gas current at the wall portion 32 during the first deflection through the angle $\alpha_1 = 34°$, impinge against the next baffle wall section including the wall portion 32' of the partition wall 46, forming a water film which is displaced by the air current towards the wall portion 32c' provided with secondary undulations U corresponding to those of the flow channel region 39 bounded by the partition walls 30 and 47. Once again, due to the curvature of the secondary undulations U there appear surface tensions which draw the water film into the ripples 61. The water can then flow downwardly under the action of gravity in these ripples.

For the flow channel 38 the wall portion 32c' of the partition wall 30 and provided with the secondary undulations U projects out of this partition wall 30. This, however, has no mentionable influence upon the air in the flow channel 38 since the air current in this region primarily bears against the baffle wall section 32', 32c', of the partition wall 46, and only to a smaller degree bears against the guide wall section of the partition wall 30. Larger water droplets possibly still contained in the air current can be further separated out from the air current in the previously discussed subsequent non-rippled baffle wall section of each flow channel 37, 38. The separated water droplets move along a path, determined by the displacement force of the air currents and the force of gravity acting upon the channel region 44, where they can flow off in the associated ripples 61 of the secondary undulations U.

When using the inventive device in air conditioning plants for instance, it may be desirable if such small water droplets which can still evaporate in the air channel after the separator are not separated out. In such case, the inventive separator can be so constructed and operated that larger fluid particles are indeed separated out, but very small droplets are left in the air current and form therein a fluid mist or haze. This can be of advantage with water separators in which a final saturation of the gas is desirable.

As construction materials suitable for the partition walls of the inventive separator, there can be employed metals, particularly iron, which as the situation may require can be provided with suitable protective coatings e.g. phosphate coatings, electroplated coatings, etc. However, also synthetic materials such as mineral base materials can be employed which permit working thereof into corrugated or rippled sheets or plates. However, in all instances there is to be taken into consideration the fact that at least the surface of the partition wall incorporates or is formed of a material which can be imbued or wetted by the fluid to be separated. In this regard, the partition walls can be either completely formed of such a material or else, only have their surfaces provided with such a material. In any case, the fluid to be separated must be capable of building a film at the surface of the partition walls. Water and fluids mixable or miscible with water, as for example low-molecular alcohol, form for example upon metals, mineral base or ceramic materials and the like, films, whereby, as indicated, a suitable removal of fat or grease from partition wall surfaces of the aforementioned type generally improves the separation effect. Partition wall sheets which are strongly oiled or covered with fat or grease are thus to have their fat or grease removed for the separation of water.

It can be advantageous to improve the wettability of the surface of the partition wall by application of suitable coatings to the partition wall. A certain surface roughness or, in fact, porosity of the partition wall material can be of advantage if such improves the wettability or film forming ability under the encountered conditions. Furthermore, it is advantageous to select the depth and form of the ripples or corrugations in such a manner that the fluid separated at the partition wall can flow downwardly in a manner as easy as possible.

The total amount of fluid separated at the partition walls streams away from the lower end of the ripples or corrugations. The ripples and particularly those ripples which are situated closer to the outlet end of the separator (viewed in the direction of gas flow) are thereby less charged or loaded with fluid at their upper end, and therefore possess under circumstances at their upper end a greater separation effect than at their lower end. This can advantageously be exploited in that the height of the partition walls can be maintained smaller at the outlet side or region of the separator than at its inlet side or region, as by suitably tapering the partition walls from a suitable location at its upper end downwardly in the direction of the outlet end. The advantage of such a measure resides in a decrease of the pressure drop or total flow resistance of the separator and in a certain saving in material.

While there is shown and described a present preferred embodiment of the invention, it is to be distinctly understood that the invention is not limited thereto but may be otherwise variously embodied and practised within the scope of the following claims.

What is claimed is:

1. In a separator for the separation of fluid particles from a gas stream: a pair of spaced substantially identical partition wall members defining a flow path therebetween for the gas stream; a smooth curved arcuate portion in each wall member defining a turning zone for the gas stream in the flow path between a concave surface of an arcuate portion of one wall of said pair of wall members and a convex surface of the arcuate portion of the other wall of said pair of wall members; planar portions in each wall member of said pair extending from the downstream end of said arcuate portions, said planar portions defining a linear gas flow zone in the flow path; a smooth baffle surface on said planar portion of the one wall extending from the concave surface defining the turning zone and lying on an extension of a tangent line from the downstream end of the concave surface, said baffle surface lying at an angle to the direction of flow of the gas stream before it is turned so that the fluid particles which are heavier than the gas and are turned less than the gas impinge on said baffle surface; a plurality of ripples on said one partition wall immediately following said smooth baffle surface and formed as a continuation thereof, each ripple having a peak extending toward the gas stream flow path, which peak lies on a side of a straight tangent line extended from said baffle surface away from the flow path, with the valleys between the peaks of each ripple forming drainage channels for the moisture separated on said baffle surface; and a guide surface formed on the convex surface of the curved portion of the other wall and the surface of the planar portion of the other wall opposite the baffle surface of said one wall.

2. In a separator as in claim 1 a second smoothly curved portion in each partition wall immediately following said ripples on said partition wall having the baffle surface to define a second turning zone for the gas stream deflecting the gas stream to the other side of its axis of flow, and a baffle surface on said other of said pair of partition walls forming a continuous planar extension of the second curved portion on said other partition wall, said baffle surface lying at an angle to the direction of flow of the gas stream before it has entered said second turning zone.

3. In a separator as in claim 2 in which said curved portions have a radius of curvature greater than half the distance between partition walls.

4. In a separator as in claim 2 in which said partition walls are spaced apart and oriented to define a linear flow zone at the end of the flow path defined which is aligned with the direction of flow of the gas stream entering between said partition walls.

5. In a separator as in claim 2 a plurality of spaced ripples on said other partition wall immediately following said second baffle surface, each ripple having a peak extending toward the gas stream flow path, which peak lies on a side of a straight tangent line extended from said baffle surface away from the flow path, with the valleys between the peaks of each ripple forming drainage channels for the moisture separated on said baffle surface.

6. In a separator as in claim 5 in which said ripples possess a depth of at least $.04b$, where $b$ is the spacing between partition walls.

References Cited

UNITED STATES PATENTS

| 877,460 | 1/1908 | Brunner et al. | 55—464 X |
|---|---|---|---|
| 947,393 | 1/1910 | Muchka | 55—440 |
| 1,519,428 | 12/1924 | Wilisch | 55—443 X |
| 2,479,625 | 8/1949 | Kimmell | 55—459 X |
| 2,643,736 | 6/1953 | Smith | 55—440 |
| 2,752,005 | 6/1956 | Avera et al. | 55—440 X |
| 2,906,512 | 9/1959 | Meek | 55—524 X |
| 2,921,647 | 1/1960 | Pietrasz | 55—440 X |
| 3,135,592 | 6/1964 | Fairs et al. | 55—524 X |

FOREIGN PATENTS

| 846,092 | 8/1952 | Germany. |
|---|---|---|
| 403,069 | 12/1933 | Great Britain. |

HARRY B. THORNTON, *Primary Examiner.*

ROBERT F. BURNETT, D. TALBERT,
*Assistant Examiners.*